United States Patent
Franzen et al.

(10) Patent No.: US 8,273,925 B2
(45) Date of Patent: Sep. 25, 2012

(54) METHOD AND DEVICE FOR THE PRODUCTION OF ALKYLENE OXIDE ADDITION PRODUCTS

(75) Inventors: Stefan Franzen, Kamen (DE); Thomas Koelker, Duesseldorf (DE)

(73) Assignee: Cognis IP Management GmbH, Duesseldorf (DE)

( * ) Notice: Subject to any disclaimer, the term of this patent is extended or adjusted under 35 U.S.C. 154(b) by 566 days.

(21) Appl. No.: 12/524,172

(22) PCT Filed: Dec. 8, 2007

(86) PCT No.: PCT/EP2007/010715
§ 371 (c)(1),
(2), (4) Date: Jul. 23, 2009

(87) PCT Pub. No.: WO2008/089820
PCT Pub. Date: Jul. 31, 2008

(65) Prior Publication Data
US 2009/0326283 A1 Dec. 31, 2009

(30) Foreign Application Priority Data
Jan. 24, 2007 (DE) .......................... 10 2007 003 500

(51) Int. Cl.
*C07C 29/00* (2006.01)
*B01J 19/00* (2006.01)
(52) U.S. Cl. ...................... 568/867; 422/198
(58) Field of Classification Search ................. 568/867; 422/198
See application file for complete search history.

(56) References Cited

U.S. PATENT DOCUMENTS

| 5,159,092 A | * | 10/1992 | Leuteritz | 554/149 |
| 5,811,595 A | | 9/1998 | Ellis | 568/620 |
| 6,180,728 B1 | | 1/2001 | Fanelli | 526/62 |
| 6,342,199 B1 | | 1/2002 | Ellis | 423/659 |
| 6,673,972 B2 | | 1/2004 | Ostrowski et al. | 568/620 |
| 6,838,061 B1 | | 1/2005 | Berg et al. | 422/198 |
| 2005/0107643 A1 | | 5/2005 | Ostrowski et al. | 568/679 |

FOREIGN PATENT DOCUMENTS

| EP | 0070797 | 1/1983 |
| EP | 0419419 | 3/1991 |
| EP | 0853975 | 7/1998 |
| WO | 98/17381 | 4/1998 |

OTHER PUBLICATIONS

Martino Di Serio et al.: Comparison of Different Reactor Types Used in the Manufacture of Ethoxylated, Propoxylated Products. In: Ind. Eng. Chem. Res. 2005 vol. 44, p. 9482-9489.

* cited by examiner

*Primary Examiner* — Sikarl Witherspoon
(74) *Attorney, Agent, or Firm* — Diehl Servilla LLC

(57) ABSTRACT

A method for the production of alkylene oxide addition products comprising (i) charging a stirred reactor with a starting compound capable of adding on or inserting alkylene oxides, introducing at least one alkylene oxide plus a different diluent gas, wherein a portion of said alkylene oxide reacts in a liquid phase with said starting compound, and the remaining alkylene oxide together with said diluent gas forms a gas phase above the liquid phase, (ii) continuously drawing off said liquid phase from the bottom of the reactor via an outlet stub, and recycling to the top of the reactor via an external circulation system, which comprises at least one heat exchanger and at least one Venturi nozzle within said external circulation system, and (iii) metering said gas phase comprising alkylene oxide into said Venturi nozzle via a vacuum line.

12 Claims, 1 Drawing Sheet

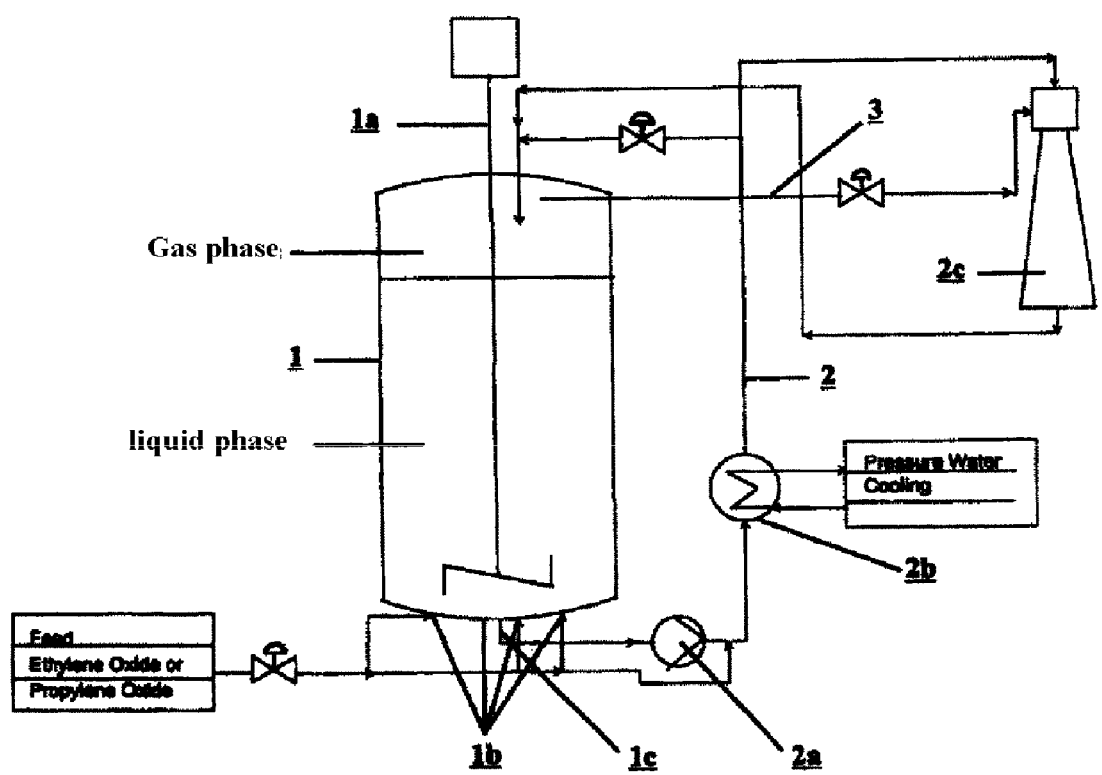
Flow diagram

METHOD AND DEVICE FOR THE PRODUCTION OF ALKYLENE OXIDE ADDITION PRODUCTS

CROSS REFERENCES TO RELATED APPLICATIONS

This application is the National Stage entry of International Application No. PCT/EP2007/010715, filed Dec. 8, 2007, which claims priority to German Patent Application No. 10 2007 003 500.6, filed Jan. 24, 2007, both of which are incorporated herein by reference in their entireties.

FIELD OF THE INVENTION

The invention is in the field of alkoxylation and relates to a novel process and to a corresponding apparatus for preparing alkylene oxide addition products.

BACKGROUND OF THE INVENTION

Addition products of alkylene oxides onto alcohols, acids or amines are important industrial products which find a variety of uses, especially as nonionic surfactants.

The alkoxylation is typically performed batchwise, for example in stirred autoclaves or loop reactors, at temperatures between 80 and 200° C.; alternatively, the liquid reaction mixture can also be dispersed into an alkylene oxide-containing gas phase. On this subject, reference is made by way of example to a review article in Ind. Eng. Chem. Res 25, 9482-9489 (2005). Typically, a compound with the nucleophilic site—for example an alcohol, a carboxylic acid, an ester or an amine—is initially charged together with the catalyst and then the desired amount of alkylene oxide is injected, which generally establishes a pressure of up to 12 bar depending on the temperature. Suitable catalysts are basic compounds, for example alkali metal alkoxides, or Lewis acids, the latter having the disadvantage that they tend to form considerable amounts of unwanted polyglycol ethers. All of these processes involve a liquid reaction mixture and an alkylene oxide-containing gas phase, which is afflicted in generic terms with the problem of inadequate mass transfer at the phase interface and hence reduced conversion.

The prior art discloses different processes to prepare these alkylene oxide addition products. Representatives mentioned here will be only the following publications, each of which discloses specific design configurations for alkoxylation reactors: EP 0853975 A1 (CP Tech), U.S. Pat. No. 5,811,595 (Ellis), U.S. Pat. No. 6,180,728 (Linde), U.S. Pat. No. 6,342,199 (Ellis), U.S. Pat. No. 6,673,972 (BASF), U.S. Pat. No. 6,838,061 (BASF), US 2005/0107643 A1 (BASF).

Frequently encountered in practice are batchwise or semicontinuous processes which are performed in stirred reactors. A disadvantage is the low mass transfer, since the alkylene oxides react only very slowly in the liquid phase even with high input of stirring energy. As a consequence of the low reaction rate, the alkylene oxide accumulates under particular conditions. This accumulation can lead to safety-critical runaway reactions. Moreover, this connection, by its nature, leads to long reaction times which are undesired for economic reasons; in addition, the color of the products may deteriorate.

The prior art additionally discloses the so-called "Venturi loop reactor", which consists essentially of a reactor with an internal throttle ("Venturi nozzle"). The starting materials are metered into the Venturi nozzle at the top of the reactor and atomized, and then form a liquid phase in the reactor, which passes through a bottom discharge valve into an external loop and is then conducted in circulation to the top of the reactor. The alkylene oxides are metered in liquid form upstream of the Venturi nozzle. In addition, ethylene oxide vapors are sucked into the Venturi nozzle from the gas phase, such that there is particularly intense mixing here [cf. EP 0070797 A1, EP 0419419 B1, U.S. Pat. No. 5,159,092, Buss]. A disadvantage is, however, that the dimensions of the reactor are fixed in this way by the size of the Venturi nozzle and there is a particular minimum size owing to the hydrodynamic conditions. In addition, the conversions are better compared to the stirred reactor, but still by no means truly satisfactory. In addition, this reactor type requires an external circulation system, which necessitates a minimum amount of raw material. The preparation of small amounts of product or of products with high growth rates, as is typical of specialty chemicals, cannot be achieved in this way. This becomes clear when the so-called growth rate in the preparation of the alkylene oxide addition products is considered, which is defined as follows:

$$\text{Growth rate } W = \frac{\text{Volume of the reaction products } [m^3]}{\text{Starting volume of starting materials } [m^3]}$$

In the case of use of the Venturi loop reactor, a growth rate between 2 and 12 is possible, but a truly flexible reactor which enables the preparation even of small amounts of product would have to have a growth rate of at least 25, better 40 to 50.

It was consequently an object of the present invention to provide a process and an apparatus for preparing alkylene oxide addition products, which firstly has a higher flexibility compared to the prior art and enables growth rates greater than 40, preferably greater than 50, and secondly achieves higher conversions within shorter reaction times, without the product quality, especially the color, suffering therefrom.

BRIEF DESCRIPTION OF THE DRAWINGS

FIG. 1 shows an apparatus for preparing alkylene oxide addition products.

DETAILED DESCRIPTION OF THE PREFERRED EMBODIMENTS

The invention provides a process for preparing alkylene oxide addition products, wherein (i) a starting compound capable of adding on or inserting alkylene oxides is initially charged in a stirred reactor through which at least one alkylene oxide is allowed to flow, which reacts a portion of the alkylene oxide in the liquid phase with the starting compound, and the remaining amount of alkylene oxide together with the gas used for phlegmatization forms a gas phase above the liquid phase, (ii) the liquid phase is drawn off continuously at the bottom of the reactor via an outlet stub and is recycled to the top of the reactor via an external circulation system, at least one heat exchanger and at least one Venturi nozzle being connected within the circulation system, and (iii) the gas phase of the stirred reactor which comprises the as yet unconverted alkylene oxides is metered into the Venturi nozzle via a suction line.

The combination of a conventional stirred reactor with external circulation system and a Venturi nozzle which is present in the external circulation system and not in the reactor provides a new reactor which is notable for high flexibility. It is not just that a wide variety of different starting materials can be used, but it is especially also possible to achieve high growth rates of more than 40 and especially more than 50, and in this way also to prepare specialty products in small volumes. In this way, the advantages of the Venturi nozzle are firstly utilized, which consist in particularly intense mass transfer, without at the same time being limited in terms of the dimensions and equipment of the reactor. At the same time, the process achieves higher yields within a shorter time, without the color quality of the products suffering therefrom.

Starting Materials

The selection of the suitable starting materials is uncritical per se, since a particular feature of the process according to the invention is specifically the alkoxylation of a wide variety of different feedstocks. Typical examples of starting compounds capable of adding on or inserting alkylene oxides are alcohols, carboxylic acids, alkyl carboxylates, polyol carboxylates and amines.

Preferred feedstocks are, however, alcohols of the formula (I)

$$R^1OH \qquad (I)$$

in which $R^1$ is a linear or branched hydrocarbon radical having 1 to 22 carbon atoms, preferably 8 to 18 carbon atoms, and 0 or 1 to 3 double bonds. Typical examples are, in addition to the lower aliphatic alcohols methanol, ethanol and the isomeric butanols and pentanols, the fatty alcohols, specifically caproic alcohol, capryl alcohol, 2-ethylhexyl alcohol, capric alcohol, lauryl alcohol, isotridecyl alcohol, myristyl alcohol, cetyl alcohol, palmoleyl alcohol, stearyl alcohol, isostearyl alcohol, oleyl alcohol, elaidyl alcohol, petroselinyl alcohol, linolyl alcohol, linolenyl alcohol, elaeostearyl alcohol, arachyl alcohol, gadoleyl alcohol, behenyl alcohol, erucyl alcohol and brassidyl alcohol, and technical-grade mixtures thereof, which are obtained, for example, in the high-pressure hydrogenation of technical-grade methyl esters based on fats and oils, or aldehydes from the Roelen oxo process, and as a monomer fraction in the dimerization of unsaturated fatty alcohols. Preference is given to technical-grade fatty alcohols having 12 to 18 carbon atoms, for example coconut fatty alcohol, palm fatty alcohol, palm kernel fatty alcohol or tallow fatty alcohol.

A further group of compounds which are suitable as starting materials for the alkoxylation is formed by the carboxylic acids of the formula (II)

$$R^2CO-OH \qquad (II)$$

in which $R^2CO$ is a linear or branched acyl radical having 1 to 22 carbon atoms and 0 or 1 to 3 double bonds. Typical examples are in particular the fatty acids, specifically caproic acid, caprylic acid, 2-ethylhexanoic acid, capric acid, lauric acid, isotridecanoic acid, myristic acid, palmitic acid, palmoleic acid, stearic acid, isostearic acid, oleic acid, elaidic acid, petroselic acid, linoleic acid, linolenic acid, elaeostearic acid, arachic acid, gadoleic acid, behenic acid and erucic acid, and technical-grade mixtures thereof, which are obtained, for example, in the pressure cleavage of natural fats and oils, in the reduction of aldehydes from the Roelen oxo process, or the dimerization of unsaturated fatty acids. Preference is given to technical-grade fatty acids having 12 to 18 carbon atoms, for example coconut fatty acid, palm fatty acid, palm kernel fatty acid or tallow fatty acid. It will be appreciated that it is also possible to alkoxylate functionalized carboxylic acids, for example hydroxycarboxylic acids such as ricinoleic acid or citric acid, or dicarboxylic acids such as adipic acid. Instead of the acids, it is also possible to use the corresponding esters with $C_1$-$C_{22}$ alcohols or glycerol; here, an insertion into the ester group then takes place.

Instead of the carboxylic acids, it is also possible to use esters thereof with alcohols having 1 to 22 and preferably 1 to 4 carbon atoms or polyols, especially glycerol, trimethylolpropane or pentaerythritol. In addition to the corresponding methyl carboxylates, the glycerides and among these in turn the partial glycerides are preferred. When they are full esters, the alkylene oxide groups are inserted into the carbonyl ester bond.

Finally, a further group of compounds suitable as starting materials is also that of amines of the formula (III)

$$R^3-NH-R^4 \qquad (III)$$

in which $R^3$ and $R^4$ are each independently hydrogen, alkyl groups having 1 to 18 carbon atoms or hydroxyalkyl groups having 1 to 4 carbon atoms. Typical examples are methylamine, dimethylamine, ethylamine, diethylamine, methylethylamine, and the different propyl, butyl, pentyl and fatty amines of analogous structure.

Alkylene Oxides

Useful alkylene oxides include ethylene oxide, propylene oxide, butylene oxide or mixtures thereof.

Performance of the Process

The conditions under which the alkoxylation is performed correspond to those which are sufficiently well known from the prior art. Depending on the starting material, the reaction temperature may vary between 50 and 200° C. and is preferably 100 to 170° C., while the pressure may be 1 to 12 and preferably 2 to 5 bar. For phlegmatization of the gas phase which forms above the reaction mixture, inert gases, for example nitrogen or carbon dioxide, are used. The alkoxylation preferably takes place in the presence of catalysts which may be of homogeneous or heterogeneous nature; for this purpose, the catalysts are typically dissolved or dispersed in the starting substances. Suitable homogeneous catalysts include, by way of example, alkali metal hydroxides or alkali metal alkoxides, especially potassium hydroxide, potassium tert-butoxide and especially sodium methoxide. In general, the alkylene oxides used are ethylene oxide and/or propylene oxide, and the molar ratio between the alkylene oxides and the starting materials for the alkoxylation may be 1:1 to 200:1, preferably 1:1 to 50:1 and especially 1:1 to 20:1.

To perform the process, the stirred reactor is first charged with the starting compounds and inertized, i.e. alternating application of reduced pressure and purging with nitrogen removes air and traces of water. Once the reactor attains the desired temperature through the external heating, the alkylene oxide is metered in through nozzles present in the base. In the liquid phase, the introduction of stirring energy causes mixing, in the course of which about 3 to 5% by volume of the alkylene oxide is depleted; the remaining amount forms a gas phase above the liquid with the gas which is injected for phlegmatization. Once a minimum conversion of about 5 to 10% of theory has been attained, the discharge valve at the bottom of the reactor is opened and the liquid phase is pumped in circulation and introduced again at the top of the reactor. In this circulation system there is at least one heat exchanger and at least one Venturi nozzle (frequently also referred to in the literature as Venturi jet). This is a component familiar to those skilled in the art, specifically a throttle apparatus with low pressure drop, in which the pressure energy converted to kinetic energy is dissipated, and which consists of two parts, specifically the mixing chamber and the diffuser. The Venturi nozzle has the task of establishing particularly intimate mixing between the liquid starting compounds and the alkylene oxide dissolved therein. For this purpose, the particular configuration of the process consists in metering alkylene oxide from the gas phase of the stirred reactor via a suction line into the mixing chamber of the Venturi nozzle, such that further, particularly intense mixing of the reactants takes place at this point, which leads to a significant enhancement of conversion and to a drastic shortening of the reaction time. As required, a heat exchanger can be connected upstream or downstream of the Venturi nozzle in the external circulation system.

Reactor

The present invention further provides an apparatus for preparing alkylene oxide addition products, which has the following constituents:
  (i) a stirred reactor (1) equipped with a stirrer apparatus (1a), metering apparatus for liquid or gaseous reaction products (1b) and a discharge stub (1c),
  (ii) an external circulation system connected to the stirred reactor (1) for pumped circulation of the liquid reaction mixture (2), equipped with a pump (2a), at least one heat exchanger (2b) and at least one Venturi nozzle (2c), and
  (iii) a suction line (3), with the aid of which the gas phase from the stirred reactor (1) is metered into the mixing apparatus of the Venturi nozzle (2c).

The apparatus as well as the indices is explained in detail in FIG. 1 which follows.

INDUSTRIAL APPLICABILITY

Process and apparatus have the advantage of high flexibility and enable a wide variety of different alkylene oxide addition products to be prepared in a wide variety of different volumes in high yields with significantly shortened reaction times compared to the prior art.

What is claimed is:

1. A process for preparing alkylene oxide addition products, comprising:
  (i) charging a stirred reactor with a starting compound capable of adding on or inserting alkylene oxides, introducing at least one alkylene oxide plus a diluent gas, wherein a portion of said alkylene oxide reacts in a liquid phase with said starting compound, and the remaining alkylene oxide together with said diluent gas forms a gas phase above the liquid phase,
  (ii) continuously drawing off said liquid phase from the bottom of the reactor via an outlet stub, recycling to the top of the reactor via an external circulation system, which comprises at least one heat exchanger and at least one Venturi nozzle within said external circulation system, wherein said Venturi nozzle is located outside of the reactor, and
  (iii) metering said gas phase comprising alkylene oxide into said Venturi nozzle via a vacuum line.

2. The process of claim 1, wherein said starting compound capable of adding on or inserting alkylene oxides is selected from the group consisting of alcohols, carboxylic acids, alkyl carboxylates, polyol carboxylates and amines and mixtures thereof.

3. The process of claim 1, wherein said alkylene oxide is selected from the group consisting of ethylene oxide, propylene oxide, butylene oxide and mixtures thereof.

4. The process of claim 1, wherein the reaction is performed at a temperature in the range of from about 50 to about 200° C.

5. The process of claim 1, wherein the reaction is performed at a pressure in the range of from about 1 to about 12 bar.

6. The process as claimed in at least one of claim 1, wherein an alkoxylation catalyst is dissolved or dispersed in said starting compound.

7. The process of claim 1, wherein a heat exchanger is connected upstream of said Venturi nozzle in said external circulation system.

8. The process of claim 1, wherein a Venturi nozzle is connected downstream or upstream of said heat exchanger in said external circulation system.

9. An apparatus for preparing alkylene oxide addition products, consisting of
  (i) a stirred reactor equipped with a stirrer apparatus, metering apparatus for liquid or gaseous reaction products and a discharge stub,
  (ii) an external circulation system connected to the stirred for pumped circulation of the liquid reaction mixture, equipped with a pump, at least one heat exchanger and at least one Venturi nozzle, wherein said Venturi nozzle is located outside of the reactor, and
  (iii) a vacuum line, with the aid of which the gas phase from the stirred reactor is metered into the mixing apparatus of the Venturi nozzle.

10. The process of claim 1, wherein said Venturi nozzle has a mixing chamber and a diffuser located outside of the reactor.

11. The process of claim 1, wherein said alkylene oxide is introduced into said liquid phase comprising said starting compound.

12. The apparatus of claim 9, wherein said Venturi nozzle has a mixing chamber and a diffuser located outside of the reactor.

* * * * *

UNITED STATES PATENT AND TRADEMARK OFFICE
CERTIFICATE OF CORRECTION

PATENT NO. : 8,273,925 B2  Page 1 of 1
APPLICATION NO. : 12/524172
DATED : September 25, 2012
INVENTOR(S) : Stefan Franzen et al.

It is certified that error appears in the above-identified patent and that said Letters Patent is hereby corrected as shown below:

Claim 6, Column 6, line 17, delete "as claimed in at least one".

Claim 9, Column 6, line 32, insert -- reactor -- before -- for --.

Signed and Sealed this
Thirteenth Day of November, 2012

David J. Kappos
*Director of the United States Patent and Trademark Office*